United States Patent
Just

(10) Patent No.: US 7,377,576 B2
(45) Date of Patent: May 27, 2008

(54) LATCHING SYSTEM FOR A CONVERTIBLE TOP

(75) Inventor: Jan Just, Bloomfield Hills, MI (US)

(73) Assignee: Magna Car Top Systems GmbH, Rochester Hills, MI (US)

( * ) Notice: Subject to any disclaimer, the term of this patent is extended or adjusted under 35 U.S.C. 154(b) by 56 days.

(21) Appl. No.: 10/598,273

(22) PCT Filed: Feb. 28, 2005

(86) PCT No.: PCT/US2005/006524

§ 371 (c)(1),
(2), (4) Date: Aug. 23, 2006

(87) PCT Pub. No.: WO2005/084290

PCT Pub. Date: Sep. 15, 2005

(65) Prior Publication Data

US 2007/0170749 A1 Jul. 26, 2007

Related U.S. Application Data

(60) Provisional application No. 60/548,626, filed on Feb. 27, 2004.

(51) Int. Cl.
*B60J 7/185* (2006.01)
(52) U.S. Cl. .................. 296/121; 292/DIG. 5
(58) Field of Classification Search ........... 296/121; 292/DIG. 5
See application file for complete search history.

(56) References Cited

U.S. PATENT DOCUMENTS

| | | | |
|---|---|---|---|
| 4,830,425 A * | 5/1989 | Muscat ................ 296/121 |
| 5,046,767 A | 9/1991 | Muscat |
| 5,085,483 A | 2/1992 | Alexander |
| 5,284,378 A * | 2/1994 | Sautter, Jr. ............ 296/224 |
| 5,328,229 A * | 7/1994 | Brandt et al. .......... 296/121 |
| 5,547,234 A | 8/1996 | Kinnanen |
| 5,904,394 A * | 5/1999 | Dilluvio et al. ........ 296/121 |
| 5,944,375 A * | 8/1999 | Schenk et al. ......... 296/108 |
| 6,155,614 A | 12/2000 | Lange |
| 6,419,297 B2 | 7/2002 | Haberl et al. |
| 6,672,646 B2 | 1/2004 | Obendiek |
| 2004/0032146 A1 | 2/2004 | Plessternings |

* cited by examiner

*Primary Examiner*—Lori L. Lyjak
(74) *Attorney, Agent, or Firm*—Brooks Kushman P.C.

(57) ABSTRACT

A latching system for a convertible top of a motor vehicle. The latching system includes a keeper disposed proximate a windshield header and a latch pin actuated by a handle. The latching system is actuated between a latched position in which the latch pin engages the keeper and an unlatched position in which the latch pin is spaced apart from the keeper.

20 Claims, 3 Drawing Sheets

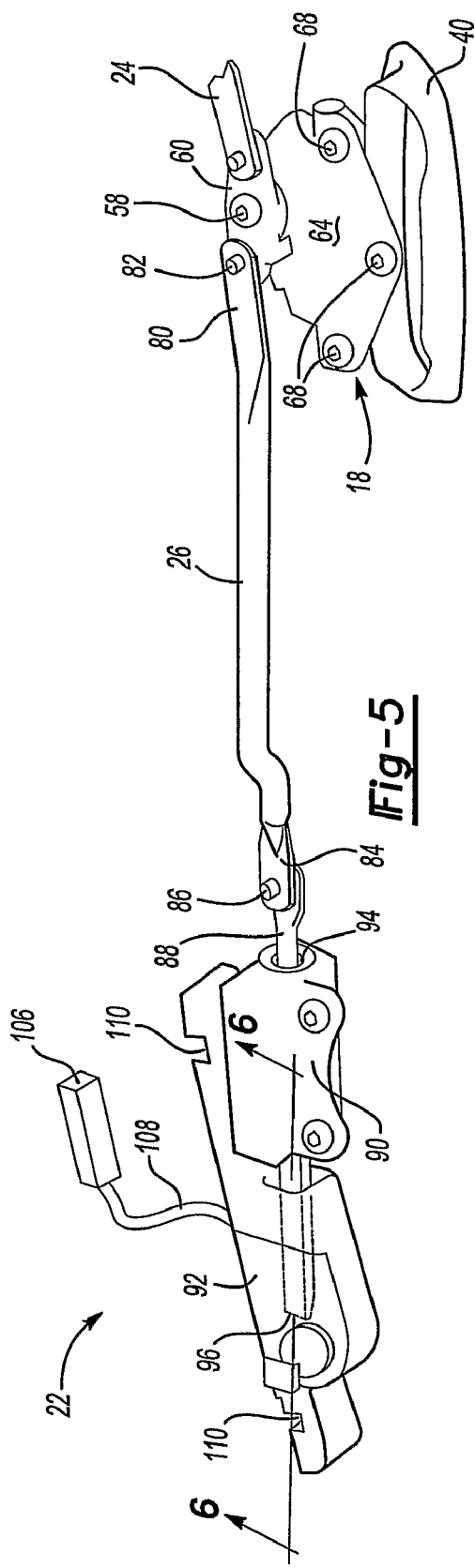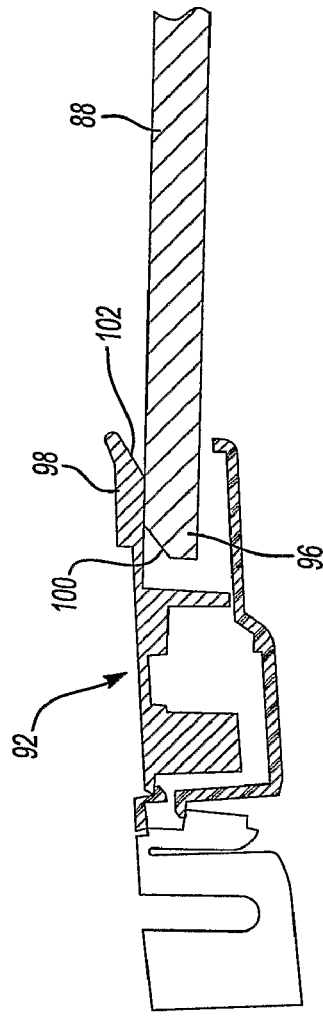

LATCHING SYSTEM FOR A CONVERTIBLE TOP

CROSS-REFERENCE TO RELATED APPLICATIONS

This application claims the benefit of U.S. provisional application Ser. No. 60/548,626 filed Feb. 27, 2004.

BACKGROUND OF THE INVENTION

1. Field of the Invention

The present invention relates to a latching system for securing a bow of a convertible top of a motor vehicle to a windshield header.

2. Background Art

Convertible tops are provided on vehicles to allow the passenger compartment to be converted to an open top configuration. Convertible tops may be extended to cover the passenger compartment or retracted to provide an open passenger compartment.

Convertible tops normally have what is known as a "one bow" that is secured by a latch or clamping mechanism to the windshield header. Prior art latches generally have active hooks for securing the one bow to the windshield header. Active hooks may be used to draw the convertible top into the proper position to be secured to the windshield header, provided that the degree of misalignment between the convertible top and the header is not excessive. If the active hook does not engage a receptacle on the header, the convertible top may appear to be latched when, in actuality, the latching operation has been unsuccessful. If the one bow is not fully secured to the windshield header damage to the convertible top may result, especially if the vehicle is driven.

Prior art header latches may be provided on both the right and left front corners of the convertible top and receptacles are provided on both sides of the windshield header. Two separate handles are generally provided with one on each side of the vehicle that must be separately manipulated to properly secure the convertible top to the windshield header. A driver must operate two handles and reach across the vehicle to operate a passenger side handle, which with some vehicle designs may be inconvenient.

Other prior art latch mechanisms may have a centrally located latch mechanism that secures the center portion of the one bow to a central portion of the windshield header. Active hooks may again be used to engage the windshield header latch receptacle. With a centrally located latch, pins or guides must be provided on the left and right sides of the convertible top that engage cooperating receptacles to hold the front corners of the convertible top against the windshield header.

With either of these approaches, improper alignment of the convertible top to the header may occur and ineffective latching may not be readily apparent.

There is a need for a simple and effective header latch mechanism that provides positive feedback confirming successful latch operation. There is also a need for a durable latch mechanism that is convenient to operate from either the passenger seat or driver seat that positively secures right and left corners of the convertible top to the right and left corners of the windshield header. The above problems and needs are addressed by applicant's invention as summarized below.

SUMMARY OF THE INVENTION

According to one aspect of the present invention, a latching system for a convertible top of a motor vehicle is provided. The latching system includes a receiver, a body molding, a latch pin guide portion, a latch pin, a connecting rod, a rotatable pin, and a handle. The receiver is disposed proximate the windshield header and includes a keeper. The body molding is attached to the convertible top and is disposed proximate the windshield header when the convertible top is in an extended position. The body molding includes a handle cavity. The latch pin guide portion is disposed proximate the body molding and has a passage. A latch pin is movably disposed in the passage. The latch pin includes a first end adapted to engage the keeper and a second pin disposed opposite the first end. The connecting rod is pivotally coupled to the second end of the latch pin at an outboard end and is pivotably coupled to a crank at an inboard end. The rotatable pin is attached to the crank. The handle is pivotally connected to the rotatable pin. The handle is adapted to pivot between a stowed position in which the handle is disposed in the handle cavity and a grasping position in which the handle is pivoted away from the handle cavity to permit the handle to rotate the rotatable pin. The latching system is actuated between a latched position in which the latch pin engages the keeper and an unlatched position in which the latch pin is spaced apart from the keeper when the rotatable pin is rotated with the handle.

The keeper may include a tapered surface. The first end of the latch pin may include a ramp surface. The ramp surface may be adapted to engage the tapered surface to align the latch pin with the keeper when the latch pin is actuated toward the latched position.

The handle may include a recess disposed near the rotatable pin for applying pressure to rotate the handle about the rotatable pin.

The latching system may include a bracket for securing the rotatable pin to the body molding. The bracket may include a hole for receiving the rotatable pin. The bracket may be attached to the body molding with a fastener or may be integrally formed with the body molding.

The crank may be attached to an end of the rotatable pin with a fastener. A sensor may be provided to detect when the latch pin engages the keeper. The receiver may include a channel to facilitate mounting to the windshield header.

According to another aspect of the present invention, a latching system for a convertible top of a motor vehicle is provided. The latching system includes a receiver, a body molding, a latch pin guide portion, a latch pin, a handle and a connecting rod. The receiver is disposed proximate a windshield header and has a keeper that includes a tapered surface. The body molding is disposed proximate the windshield header when the convertible top is in an extended position and includes an integrally formed handle cavity. The latch pin guide portion is disposed proximate the body molding and has a passage. The latch pin is movably disposed in the passage and includes first and second ends disposed outside the passage. The first end has a ramp surface. The handle assembly includes a handle that is adapted to pivot between a stowed position and a grasping position. The connecting rod links the latch pin and handle assembly. The tapered surface engages the ramp surface to align the latch pin with the keeper when the latching system is actuated toward a latched position and the latch pin is spaced apart from the keeper when disposed in an unlatched position.

The handle assembly may include a rotatable pin having a lower end disposed adjacent to a handle flange and an upper end coupled to a crank that is pivotally connected to the connecting rod.

The bracket may be provided that has a hole for receiving and securing the rotatable pin. The upper and lower ends of the rotatable pin may extend from the hole. The tapered and ramp surfaces may be disposed substantially parallel to each other.

According to another aspect of the present invention, a latching system for a convertible top of a motor vehicle is provided. The latching system includes a receiver, a body molding, a latch pin guide portion, a latch pin, a handle assembly, and a connecting rod. The receiver is disposed proximate the motor vehicle and has a keeper that includes a tapered surface. The body molding includes a bracket and a handle cavity. The latch pin guide portion is disposed proximate the body molding and has a passage. The latch pin is movably disposed in the passage and includes first and second ends. The first end has a ramp surface configured to engage the tapered surface. The handle assembly is secured to the body molding with a bracket. The handle assembly includes a handle that is adapted to pivot the about a first axis between stowed and grasping positions and is adapted to rotate about a second axis disposed generally perpendicular to the first axis. The connecting rod links the latch pin and the handle assembly. The latch pin moves linearly between latched and unlatched positions when the handle is rotated about the second axis.

The bracket and handle cavity may be integral with the body molding. The body molding may include a hand grip filler portion received within the handle when the handle is disposed in the stowed position. The bracket may be disposed adjacent to the hand grip filler portion.

BRIEF DESCRIPTION OF THE DRAWINGS

FIG. 5 is a fragmentary perspective view of the left side of the handle assembly and latch receiver of the latching system of the present invention; and FIG. 6 is a cross-sectional view taken along line 6-6 in FIG. 5.

DETAILED DESCRIPTION OF THE PREFERRED EMBODIMENT(S)

Figure 1:
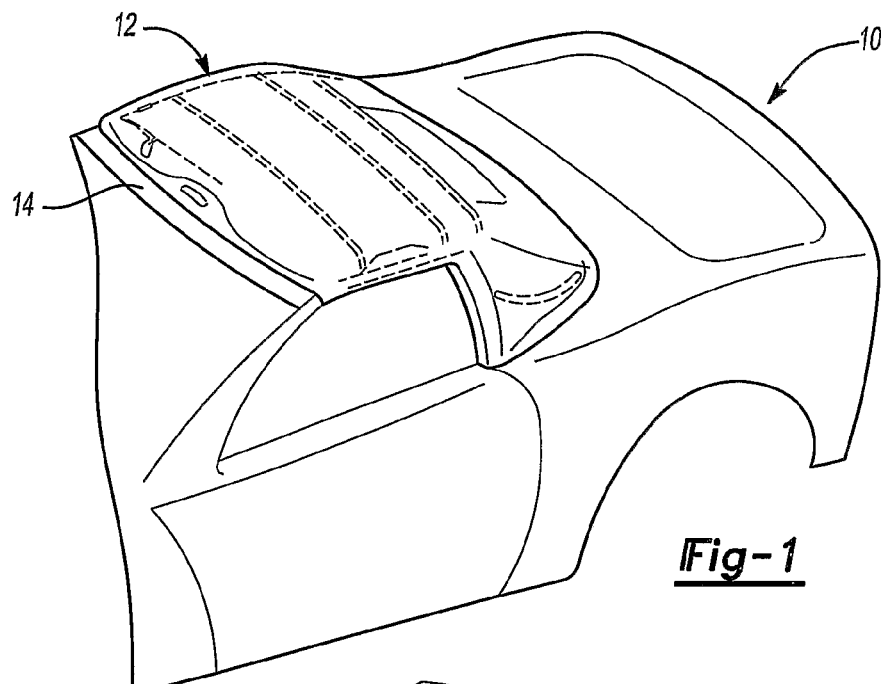
FIG. 1 is a fragmentary perspective view of a vehicle having a convertible top.

Referring to FIG. 1, a vehicle 10 is shown with a convertible top 12. The convertible top 12 is shown in its extended, or passenger compartment covering, position wherein the convertible top 12 is secured to the windshield header 14 of the vehicle 10.

Figure 2:
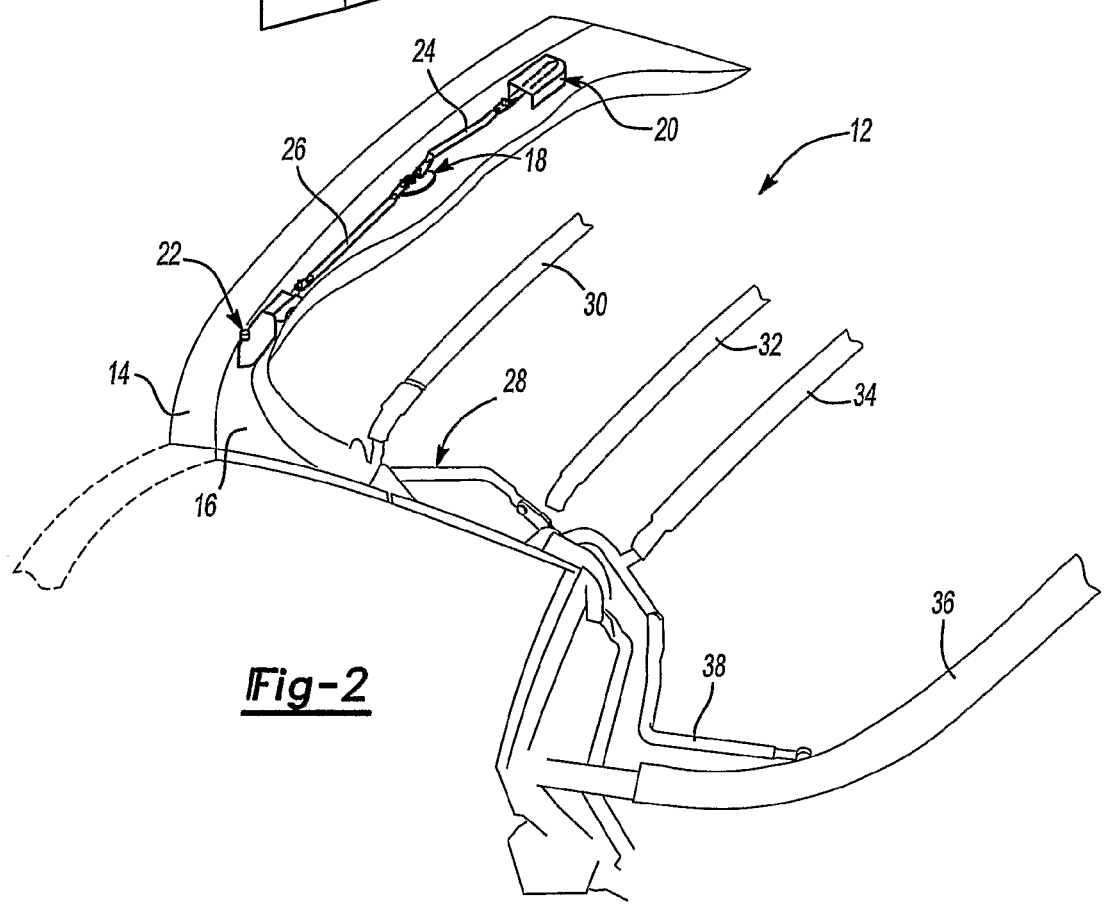
FIG. 2 is a fragmentary perspective view of the left side of a convertible top stack linkage structure and windshield header.

Referring to FIG. 2, the convertible top 12 is shown in an extended position with its covering removed to show the support frame or top stack structure. In FIG. 2, a one bow 16 of the convertible top 12 is secured to the windshield header 14. A handle assembly 18 is mounted on the one bow 16. Right and left retainer latches 20 and 22 connect the one bow 16 to the windshield header 14 as will be more fully described below.

A right connecting rod 24 connects the handle assembly 18 to the right retainer latch 20. A left connecting rod 26 connects the handle assembly 18 to the left retainer latch 22.

In FIG. 2, the left portion of a top stack linkage is illustrated and is generally indicated by reference numeral 28. The top stack linkage 28 includes a two bow 30, three bow 32, four bow 34 and five bow 36. While a five bow convertible top is illustrated, the five bow 36 may be eliminated and a four bow system may be provided with the latching system of the present invention. In the four bow system, the rear edge of the convertible top may be secured by a tack strip or other permanent fasteners to the vehicle body.

A tensioning link 38 is also illustrated that is used to provide tension and manipulate the five bow 36, as required, depending upon the extension and retraction cycles of the convertible top 12.

Figure 3:
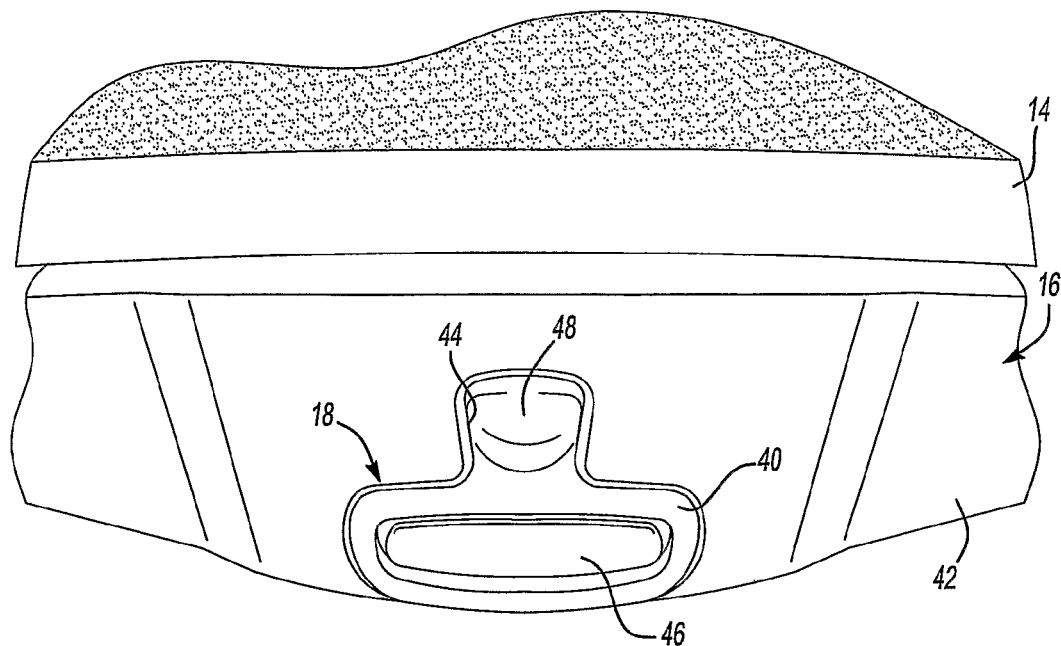
FIG. 3 is a fragmentary rear elevation view of a handle and one bow of a latching system of the present invention.

Referring to FIG. 3, a handle 40 of the handle assembly 18 is shown in conjunction with the one bow body molding 42. The one bow body molding 42 defines a handle cavity 44 adapted to receive the handle 40 when the handle 40 is in a stowed position as shown in FIG. 3. A hand grip filler portion 46 is received within the handle 40 when the handle is properly stowed or seated in the one bow body molding 42. A finger recess 48 is provided on the handle 40 to indicate a location on the handle 40 where finger pressure is applied to cause the handle 40 to rotate downwardly into a grasping position as shown in phantom in FIG. 4. The handle may be rotated by 90° or more as indicated by the dashed arrow and dashed lines in FIG. 4.

Figure 4:
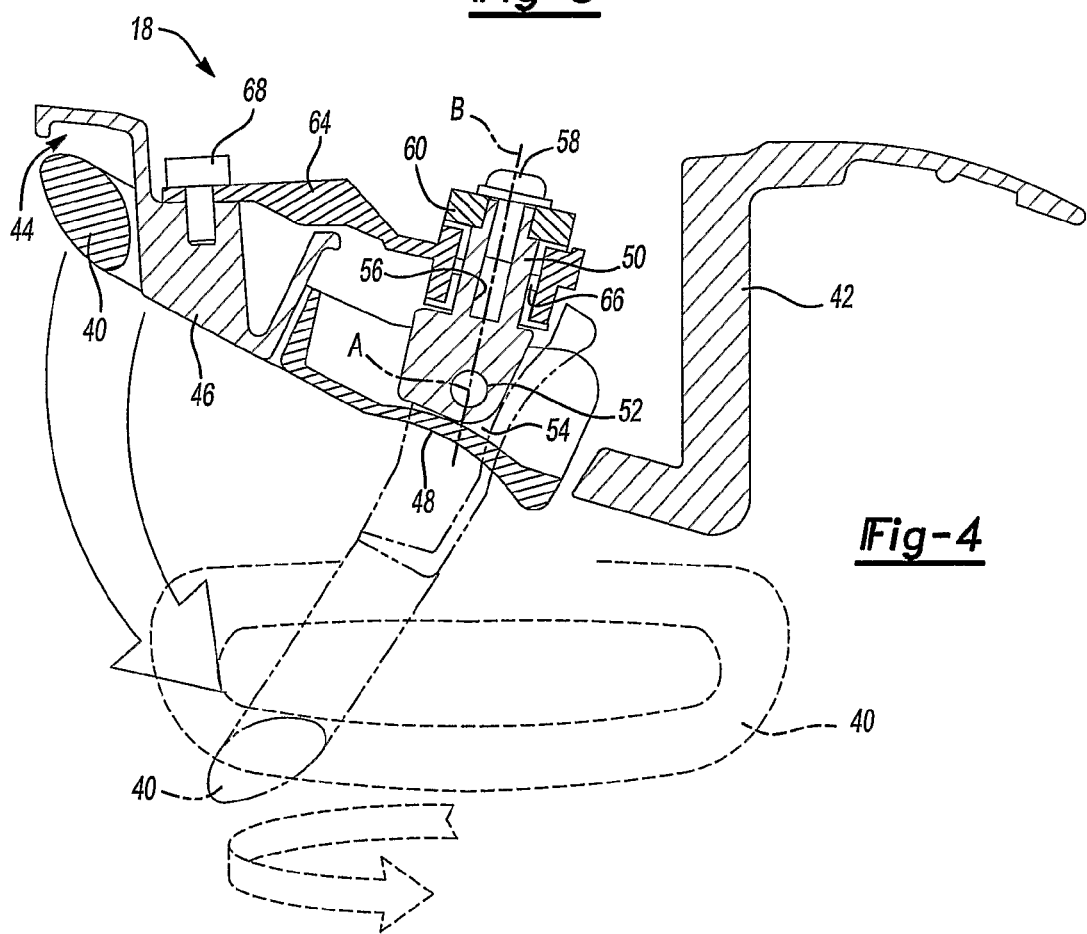
FIG. 4 is a center longitudinal cross-sectional view of the handle assembly of the latching system of the present invention.

With continued reference to FIG. 4, the handle 40 is pivotally connected to a rotatable pin 50 that is rotated by the handle 40 to actuate the retainer latches 20, 22. More specifically, a pivot pin 52 interconnects the rotatable pin 50 with the handle 40 and provides a first axis of rotation A so that the handle 40 may be pivoted downwardly between the stowed position and the grasping position in which the handle 40 may turn the rotatable pin 50. The rotatable pin 50 provides a second axis of rotation B that may be disposed generally perpendicular to the first axis of rotation A. In one embodiment, at least one flange 54 extends from the handle 40 and engages an exterior surface of the rotatable pin 50 when the handle 40 is rotated.

A receptacle 56 is provided in the end of the rotatable pin 50 for receiving a fastener 58. A bell crank 60 is secured to the rotatable pin 50 with the fastener 58 and is connected to the retainer latches 20,22, as will be described in more detail below.

A bracket 64 may be used to secure the rotatable pin 50 to the one bow body molding 42. In the embodiment shown, a hole 66 is provided in the bracket 64 to receive the rotatable pin 50. The bracket 64 may be secured to the one bow body molding 42 in any suitable manner, such as with one or more fasteners 68.

The handle 40, one bow body molding 42, handle cavity 44, and bracket 64 may be manufactured using a Thixomolding® process in which magnesium is injection molded to net size and shape. The Thixomolding® process reduces or eliminates machining operations and allows complex parts to be formed in a single step. The molded parts are strong and durable and allow parts to be made in one piece. Prior art designs for corresponding parts formerly required multiple pieces to be assembled in subassembly operations.

Referring to FIG. 5, the handle assembly 18 is shown connected to the right and left connecting rods 24,26. For simplicity, the structure connected to the left connecting rod 26 is shown in detail. Similar structural elements are associated with the right connecting rod 26. The handle assembly 18 is connected to the left retainer latch 22 by left connecting rod 26. The rotatable pin 50 and bell crank 60 are operated by the handle assembly 18. The rotatable pin 50 rotates the bell crank 60 and moves the right and left connecting rods 24,26 in a reciprocating motion in a transverse direction relative to the vehicle 10. An inner end 80 of the left connecting rod 26 is connected by a pin 82 to the bell crank 60. An outboard end 84 of the left connecting rod 26 is secured by a pin 86 to a latch pin 88. Latch pin 88 is received within latch pin guide portion 90 of the left retainer latch 22. A receiver 92 selectively receives the latch pin 88 that extends through a passage 94 in the latch pin guide portion 90.

Referring to FIGS. 5 and 6, latch pin 88 has a distal end 96 that may be received in a keeper 98 defined by the receiver 92. The distal end 96 includes a ramp surface 100 that engages a tapered surface 102 formed on the keeper 98. As the latching system is operated to secure the one bow 16 to the windshield header 14, the latch pin 88 is driven towards the keeper 98. The ramp surface 100 may engage the tapered surface 102 to aid in aligning the latch pin 88 with the keeper 98.

A sensor 106 may detect when the latch pin 88 is fully received in the keeper 98. Alternatively, the sensor 106 may receive a signal from an actuator (not shown) disposed within the receiver 92 through wire 108. The sensor 106 may be of any suitable type, such as a limit switch, Hall effect transducer, or a proximity sensor that detects proper insertion of the latch pin 88 in the keeper 98.

Channels 110 may be formed in the receiver 92 to facilitate mounting the receiver 92 on the windshield header 14.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A latching system for a convertible top of a motor vehicle, the latching system comprising:
   a receiver disposed proximate a windshield header, the receiver having a keeper;
   a body molding attached to the convertible top and disposed proximate the windshield header when the convertible top is in an extended position, the body molding including a handle cavity;
   a latch pin guide portion disposed proximate the body molding, the latch pin guide portion having a passage;
   a latch pin moveably disposed in the passage, the latch pin having a first end adapted to engage the keeper and a second end disposed opposite the first end;
   a connecting rod pivotally coupled to the second end of the latch pin at an outboard end and pivotally coupled to a crank at an inboard end;
   a rotatable pin attached to the crank; and
   a handle pivotally connected to the rotatable pin, the handle being adapted to pivot between a stowed position in which the handle is disposed in the handle cavity and a grasping position in which the handle is pivoted away from the handle cavity to permit the handle to rotate the rotatable pin;
   wherein the latching system is actuated between a latched position in which the latch pin engages the keeper and an unlatched position in which the latch pin is spaced apart from the keeper when the rotatable pin is rotated with the handle.

2. The latching system of claim 1 wherein the keeper further comprises a tapered surface and the first end of the latch pin further comprises a ramp surface adapted to engage the tapered surface to align the latch pin with the keeper when the latch pin is actuated toward the latched position.

3. The latching system of claim 1 wherein the handle further comprises a recess disposed near the rotatable pin for applying pressure to rotate the handle about the rotatable pin.

4. The latching system of claim 1 further comprising a bracket for securing the rotatable pin to the body molding.

5. The latching system of claim 4 wherein the bracket further comprises a hole for receiving the rotatable pin.

6. The latching system of claim 4 wherein the bracket is attached to the body molding with a fastener.

7. The latching system of claim 4 wherein the bracket is integrally formed with the body molding.

8. The latching system of claim 1 wherein the handle cavity is integrally formed with the body molding.

9. The latching system of claim 1 wherein the crank is attached to an end of the rotatable pin with a fastener.

10. The latching system of claim 1 further comprising a sensor adapted to detect when the latch pin engages the keeper.

11. The latching system of claim 1 wherein the receiver further comprises a channel to facilitate mounting to the windshield header.

12. A latching system for a convertible top of a motor vehicle, the latching system comprising:
    a receiver disposed proximate a windshield header, the receiver having a keeper that includes a tapered surface;
    a body molding disposed proximate the windshield header when the convertible top is in an extended position, the body molding including an integrally formed handle cavity;
    a latch pin guide portion disposed proximate the body molding, the latch pin guide portion having a passage;
    a latch pin moveably disposed in the passage, the latch pin including a first end having a ramp surface and a second end disposed opposite the first end, the first and second ends being disposed outside the passage;
    a handle assembly including a handle that is adapted to pivot between a stowed position in which the handle is disposed in the handle cavity and a grasping position in which the handle is pivoted away from the handle cavity; and
    a connecting rod linking the latch pin and the handle assembly;
    wherein the tapered surface engages the ramp surface to align the latch pin with the keeper when the latching system is actuated toward a latched position and the latch pin is spaced apart from the keeper in an unlatched position.

13. The latching system of claim 12 wherein the handle assembly further comprises a rotatable pin having a lower end disposed adjacent to a handle flange and pivotally coupled to the handle and an upper end coupled to a crank that is pivotally connected to the connecting rod.

14. The latching system of claim 13 further comprising a bracket having a hole for receiving the rotatable pin and securing the rotatable pin to the body molding.

15. The latching system of claim 14 wherein the upper and lower ends of the rotatable pin extend from the hole.

16. The latching system of claim 14 wherein the bracket is integrally formed with the body molding.

17. The latching system of claim 12 wherein the tapered and ramp surfaces are disposed substantially parallel to each other.

18. A latching system for a convertible top of a motor vehicle, the latching system comprising:
- a receiver disposed proximate the motor vehicle, the receiver having a keeper that includes a tapered surface;
- a body molding including a bracket and a handle cavity;
- a latch pin guide portion disposed proximate the body molding and having a passage;
- a latch pin moveably disposed in the passage, the latch pin including a first end having a ramp surface configured to engage the tapered surface and second end disposed opposite the first end, the first and second ends being disposed outside the passage;
- a handle assembly secured to the body molding with the bracket, the handle assembly including a handle that is adapted to pivot about a first axis between a stowed position and a grasping position and rotate about a second axis disposed generally perpendicular to the first axis; and
- a connecting rod linking the latch pin and the handle assembly;
- wherein the latch pin moves linearly between a latched position in which the latch pin engages the keeper and an unlatched position in which the latch pin is spaced apart from the keeper when the handle is disposed in the grasping position and the handle is rotated about the second axis.

19. The latching system of claim 18 wherein the bracket and handle cavity are integral with the body molding.

20. The latching system of claim 18 wherein the body molding further comprises a hand grip filler portion received within the handle when the handle is in the stowed position and wherein the bracket is disposed adjacent to the hand grip filler portion.

* * * * *